W. J. LOVELAND.
SELF CENTERING HOLDER FOR TESTING MACHINES.
APPLICATION FILED MAY 6, 1914.
1,122,289.
Patented Dec. 29, 1914.
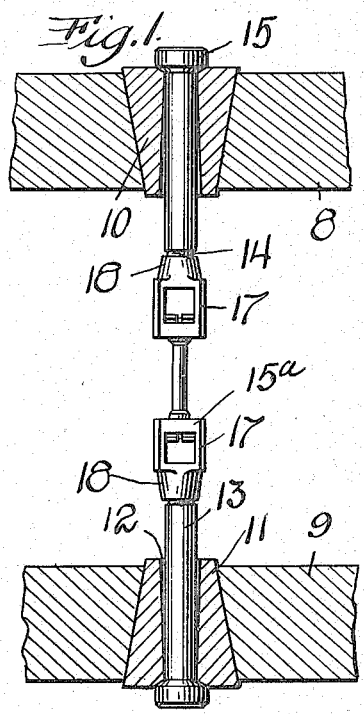
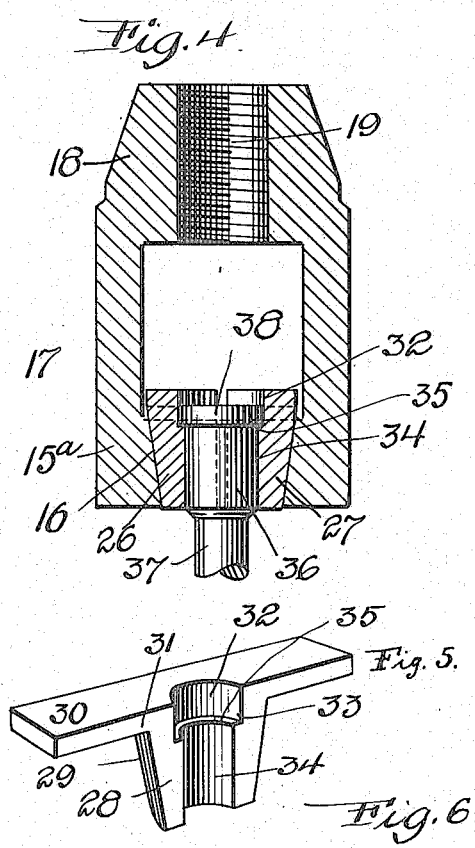
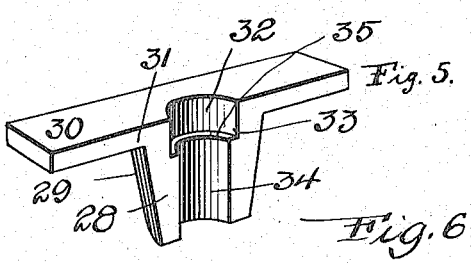
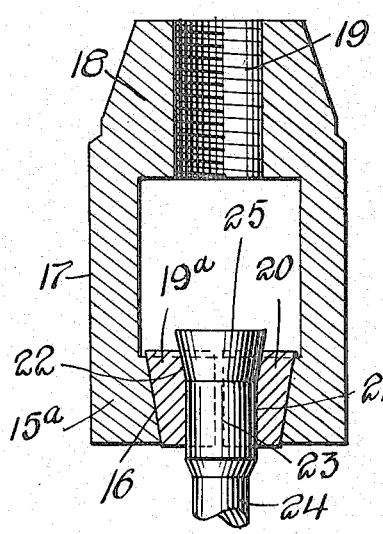
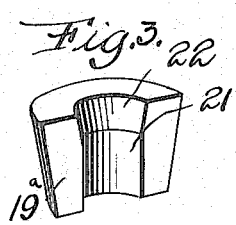
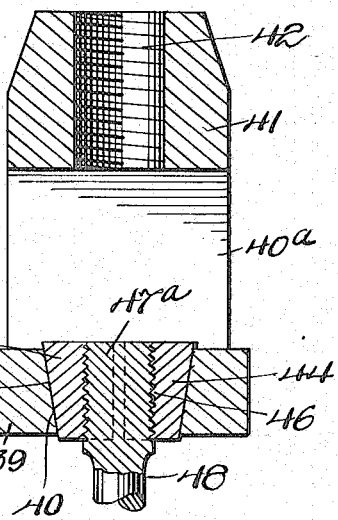
WITNESSES
Samuel Payne
Max H. Srolong
INVENTOR
W. J. Loveland.
BY Henry C. Evert
ATTORNEY

UNITED STATES PATENT OFFICE.

WILLIAM J. LOVELAND, OF PITTSBURGH, PENNSYLVANIA.

SELF-CENTERING HOLDER FOR TESTING-MACHINES.

1,122,289.  Specification of Letters Patent.  Patented Dec. 29, 1914.

Application filed May 6, 1914. Serial No. 836,764.

*To all whom it may concern:*

Be it known that I, WILLIAM J. LOVELAND, a citizen of the United States of America, residing at Pittsburgh, in the county of Allegheny and State of Pennsylvania, have invented certain new and useful Improvements in Self-Centering Holders for Testing-Machines, of which the following is a specification, reference being had therein to the accompanying drawing.

This invention relates to self centering holders for testing machines, and has for its object to provide a device of such class, in a manner as hereinafter set forth, to overcome the objections heretofore existing in holders now in general use, one of such objections being the constant breaking of the coupling head for the specimen during the testing operation, and another of the objections being the stripping of the threads of the coupling head, under such conditions damaging the head to such an extent as to prevent further use of the same.

A further object of the invention is to provide a specimen holder for testing machines including a coupling head for the specimen having means whereby the more pull upon a pair of oppositely disposed heads, the tighter the ends of the specimen will be secured to the heads, under such conditions preventing the separating of the ends of the specimen being tested from the coupling ends.

Further objects of the invention are to provide a self centering specimen holder for testing machines, which is simple in its construction and arrangement, unusually strong, durable, efficient in its use, conveniently set up and inexpensive.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a top plan view of a pair of specimen holders in accordance with this invention, showing the adaptation thereof in connection with a specimen and with the machine, Fig. 2 is a vertical sectional view of a coupling head showing one end of a specimen connected therewith, Fig. 3 is a perspective view of one of the sections of the retaining member, Fig. 4 is a vertical sectional view of a modified form of coupling head, Fig. 5 is a perspective of one section of the form of retaining member employed in the construction shown in Fig. 4, Fig. 6 is a vertical sectional view of another modified form of coupling head showing the adaptation therewith of one end of a specimen, and Fig. 7 is a perspective view of one of the sections of a form of retaining member employed in the construction shown in Fig. 6.

Referring to the drawings in detail, 8 and 9 denote the supporting elements of a testing machine to which a pair of self centering specimen holders are connected through the medium of a pair of oppositely disposed tapering plugs 10 and 11, each provided with a longitudinally extending bore 12, which gradually increases in diameter from its outer toward its inner end, and through the bores 12 are adapted to extend the body portions 13 of a pair of oppositely disposed self centering specimen holders. The body portion 13 of a holder consists of an elongated cylindrical body, having a reduced peripherally threaded inner end 14 and having its outer end provided with a head 15, which slightly extends into the outer end of the tapered plug. The supporting elements 8 and 9, plugs 10 and 11 and the body portion 13 are of known construction and upon the reduced inner end 14 of a body portion is adapted to be secured a coupling head in accordance with this invention.

The form of coupling head shown in Figs. 2 and 3 consists of a plate 15ª, formed with a tapered opening 16, the latter gradually increasing in diameter from its outer toward its inner end. Formed integral with said plate 15ª, at each end thereof, is an arm 17, and the said arms 17 terminate in a cap 18, provided with a centrally disposed opening having the wall thereof threaded as at 19 for engagement with the peripherally threaded reduced end 14 of a body portion 13. Mounted in the opening 16 is a tapering retaining member formed of two sections 19ª and 20, and each of said sections is provided, centrally of its inner face, with a semi-circular groove 21, which extends from the outer end of the section and terminates at a point removed from the inner end of the section and merges into a semi-circular groove 22, which gradually tapers toward the inner end of the section and the said grooves 21, when the sections are positioned in the opening 16 provide a circular opening for the reception of the cylindrical portion 23 of the end of a specimen 24. When the sections 19 and 20 are in position in the opening 16, the grooves 22 provide a tapering opening for the reception of the tapered portion 25 of the end of the specimen 24.

It is obvious from the foregoing construction that the greater pull upon the coupling head, the tighter the end of the specimen 24 will be secured to the coupling head, in view of the fact that a wedging action is set up between the retaining member and the wall of the opening 16, and a wedging action is set up between the tapered portion 25 of the end of the specimen 24, and the wall of the opening formed by the grooves 22.

Referring to the form of coupling head shown in Figs. 4 and 5, the difference between the same and that shown in Figs. 2 and 3, resides in the retaining member, and the reference characters used in connection with Figs. 2 and 3, with the exception of those employed to designate the retaining member and the specimen in Figs. 2 and 3, are used to designate the coupling head illustrated in Figs. 4 and 5. The retaining member illustrated in Figs. 4 and 5, and which is seated in the openings 16 of the plate 15 consists of two sections 26 and 27, and the body portion of each of said sections is semi-cylindrical in cross section. The body portion of each of said sections is indicated at 28 and has its outer face 29 thereof tapered from its outer toward its inner end. The body portion 28 is formed integral with a rectangular cap piece 30, the latter having its inner edge 31 flush with the inner face of the body portion 28. The said body portion 28 merges into said cap piece 30. The inner edge 31 of the cap pieces 30, centrally thereof, is formed with a semi-circular groove 32, and the inner part of the body portion 28 is formed with a semi-circular groove 33 of the same size of the groove 32, and which merges into said groove 32 and the inner face of the body portion 38 is furthermore provided with a semi-circular groove 34 of less size than the groove 33, thereby providing a shoulder 35. The sections of the retaining member are adapted to abut and when in such position the body portions 28 form a tapered plug which is seated in the opening 16, and bears against the tapered wall of the opening 16. When the sections of the retaining member are in abutting position, the grooves 32 33 and 34 of one body portion 28 register with the groove 32, 33 and 34 of the other body portion and provide a pair of circular openings, one being of greater diameter than the other. The registering grooves 32 and 33 form the opening of greater diameter. The opening formed at the grooves 34 are adapted to receive the cylindrical portion 36 of the specimen 37 and the opening formed by the grooves 32 and 33 are adapted to receive the head 38 of the end of the specimen 37, the latter bears against the seat 35 as illustrated in Fig. 4. From the construction and arrangement of elements as illustrated in Fig. 4, it is obvious that the more the pull upon the specimen 37, the tighter the retaining member will be secured to the plate 15, due to the wedging action between the retaining member and the wall of the opening 16.

In the modified form shown in Fig. 6, 39 denotes a plate provided with a centrally disposed opening 40, which gradually increases in diameter from the outer toward the inner end thereof. Formed integral with the plate 39, at each side thereof, and terminating inwardly with respect to each of the plates 39, is an arm 40, and the said arms terminate in a cap piece 41 provided with a centrally disposed opening 42, having the wall thereof threaded for engagement with the reduced threaded inner end 14 of the body portion 13. Mounted in the opening 40, is a retaining member in the form of a tapered plug, and which is formed of two sections 43 and 44. The body portion of each of the sections of the retaining member is indicated at 45, and the inner face of said body portion 45 is formed with a semi-circular groove 46, having the wall thereof threaded. The outer face of the section 45 is tapered as at 47. When the sections 43 and 44 are positioned in the opening 40, the tapered outer faces of said sections bear against the tapered wall of the opening 40, and under such conditions a wedging action is set up between the retaining member and the wall of the opening 40 when the retaining member is pulled outwardly with respect to the plate 39. When the sections 43 and 44 are positioned in the opening 40, the grooves 46 register and provide a circular opening, and extending in said opening and engaging the threads of the walls of the grooves 46 is a peripherally threaded end 47 of a specimen 48.

By the foregoing arrangement of elements as illustrated in Fig. 6, it is obvious that the more the pull upon the retaining member the tighter it will engage the plate 39 due to the wedging action between the retaining member and the wall of the opening 40.

By forming the retaining members of two sections, it provides for the convenient positioning of the ends of the specimens, and furthermore if one section of a retaining member should become damaged a new one can be substituted, thus obviating the necessity of casting aside the entire retaining member when formed of one piece and when but one side becomes damaged.

What I claim is:—

1. A self centering specimen holder for testing machines comprising a body portion adapted to be connected with the supporting element, of a testing machine, a coupling head comprising a plate having a tapering opening and further including a pair of outwardly projecting spaced arms terminating in a cap detachably secured to said body portion, and a tapered retaining member mounted in said opening and provided with means to receive one end of the specimen to be tested.

2. A self centering specimen holder for testing machines comprising a body portion adapted to be connected with the supporting element of a testing machine, a coupling head comprising a plate having a tapering opening and further including a pair of outwardly projecting spaced arms terminating in a cap detachably secured to said body portion, and a tapered retaining member mounted in said opening and provided with means to receive one end of the specimen to be tested, said retaining member formed of a pair of complemental sections.

3. A self centering specimen holder for testing machines comprising a body portion adapted to be connected with the supporting element of a testing machine, a coupling head detachably secured to said body portion and provided with a tapering opening, and a tapering retaining member mounted in said opening and provided with a circular and a tapered opening, said tapered opening merging into said circular opening and constituting means for the reception of one end of the specimen to be tested.

4. A self centering specimen holder for testing machines comprising a body portion having a coupling head attached thereto having a plate formed with a tapering opening and further including a pair of outwardly projecting spaced arms terminating in a cap detachably secured to said body portion, and a retaining member having a wedging engagement in said opening with said coupling head and provided with means for the reception of one end of the specimen to be tested.

5. A self centering specimen holder for testing machines comprising a body portion having a coupling head attached thereto having a plate formed with a tapering opening and further including a pair of outwardly projecting spaced arms terminating in a cap detachably secured to said body portion, and a retaining member having a wedging engagement in said opening with said coupling head and provided with means for the reception of one end of the specimen to be tested, said retaining member formed of two sections.

6. A self centering specimen holder for testing machines comprising a body portion having a coupling head attached thereto having a plate formed with a tapering opening and further including a pair of outwardly projecting spaced arms terminating in a cap detachably secured to said body portion, a retaining member having a wedging engagement in said opening with said head and provided with means obtaining a wedging engagement in said body portion there between and one end of the specimen to be tested.

7. A self centering specimen holder for testing machines comprising a body portion having a coupling head attached thereto having a plate provided with a tapered opening and including a pair of outwardly projecting spaced arms terminating in a cap detachably secured to said body portion, a retaining member having a wedging engagement with said head and provided with means obtaining a wedging engagement in said body portion there between and one end of the specimen to be tested, said retaining member formed of two sections.

In testimony whereof I affix my signature in the presence of two witnesses.

WILLIAM J. LOVELAND.

Witnesses:
MAX H. SROLOVITZ,
L. DUNN.